(12) United States Patent
Moore et al.

(10) Patent No.: US 8,120,938 B2
(45) Date of Patent: Feb. 21, 2012

(54) METHOD AND APPARATUS FOR ARRANGING MULTIPLE PROCESSORS ON A SEMICONDUCTOR CHIP

(75) Inventors: Charles H. Moore, Sierra City, CA (US); Jeffrey Arthur Fox, Berkeley, CA (US); John W. Rible, Santa Cruz, CA (US)

(73) Assignee: VNS Portfolio LLC, Cupertino, CA (US)

( * ) Notice: Subject to any disclaimer, the term of this patent is extended or adjusted under 35 U.S.C. 154(b) by 978 days.

(21) Appl. No.: 12/148,523

(22) Filed: Apr. 18, 2008

(65) Prior Publication Data

US 2009/0265524 A1    Oct. 22, 2009

(51) Int. Cl.
*G11C 5/02* (2006.01)

(52) U.S. Cl. ........ 365/51; 365/63; 365/230.06; 257/206; 257/E27.108

(58) Field of Classification Search ................. 257/206, 257/E27.108; 365/51, 63, 230.06
See application file for complete search history.

(56) References Cited

U.S. PATENT DOCUMENTS

| | | | | |
|---|---|---|---|---|
| 4,884,118 | A | * | 11/1989 | Hui et al. .................. 257/206 |
| 5,343,058 | A | * | 8/1994 | Shiffer, II .................. 257/204 |
| 6,731,264 | B2 | * | 5/2004 | Koyama et al. ............. 345/100 |

* cited by examiner

*Primary Examiner* — VanThu Nguyen
(74) *Attorney, Agent, or Firm* — Edward P. Heller, III

(57) ABSTRACT

A method and apparatus for connecting multiple cores to form a multi core processor. Each processor is connected to at least two other processors, each of which is a mirror image of the first processor. The processors are connected to form a two dimensional matrix connected by one drop busses.

4 Claims, 15 Drawing Sheets

METHOD AND APPARATUS FOR ARRANGING MULTIPLE PROCESSORS ON A SEMICONDUCTOR CHIP

BACKGROUND OF THE INVENTION

1. Field of Invention

The present invention relates to the field of computers and computer processors, and more particularly to a method for parallel processing utilizing a combination of multiple computers on a single microchip, wherein operating efficiency is important because of the desire for increased operating speed. This invention relates to computer technology, particularly semiconductor microprocessor technology and with still greater particularity the arrangement of multiple processors on a single semiconductor to provide easier ability to connect and speed.

2. Description of the Background Art

Semiconductor technology advances by providing greater numbers of components in a given area of semiconductor. This has largely occurred due to advances in technology allowing the fabrication of ever smaller components. Smaller components also operate faster than larger components. The initial success of such operations has led to the construction of a microprocessor with associated RAM and ROM on a single chip. In recent years there have been first two microprocessors on a single chip, then four, and eight in the near future. As the number of processors increases, so also does the difficulty in the processors communicating with each other and the outside environment.

As the number of processors increases, the connections between the processors become a more difficult problem. The simplest method is to connect all processors to a common bus and allow the processors to communicate with each other through packet protocols. In two and four processor systems the processors are sometimes mirror images of each other for ease of connection. A difficulty with such an arrangement is that the advantage of multiple processors is rapidly lost through the complexity of the routing instructions. Each of the communications is received by each of the processors and ignored by those processors to which no communication is directed. As a result, system bandwidth rapidly deteriorates as the number of processors increases. There is thus a longstanding need for a method of arranging and connecting an unlimited number of processors without deterioration of system bandwidth.

Dividing a task and performing multiple processing and computing operations in parallel at the same time is known in the art, as are many systems and structures to accomplish this. An example is systolic array processing wherein a large information stream is divided up among rows of processors that perform sequential computations by column, and pass results to the next column. Other examples are found in the field of supercomputing, wherein multiple processors may be interconnected and tasks assigned to them in a number of different ways, and communication of intermediate results between processors and new data and instructions to them may be provided through crossbar switches, bus interconnection networks with or without routers, or direct interconnections between processors with message passing protocols such as MPICH, used on large machines.

Another solution has been to provide a switching network at the center of the processor array. The processors are all connected to this network, which allocates tasks and divides the work. The processors are not connected directly to each other and are sometimes mirror images of each other.

SUMMARY OF THE INVENTION

The invention provides a method and apparatus for arranging a potentially unlimited number of cores on a single chip. The method and apparatus further provides connections between individual cores and their adjacent neighbors, allowing assignment of separate computing functions to different cores. The method and apparatus optimizes computing speed and ease of connection between the cores.

The method and apparatus includes the use of mirror images of adjacent processors, both in the vertical and horizontal directions. The processors are connected to their images with one drop busses. There is no common bus or central switching device, as such functions are performed by the processors. Each processor is connected to as many as four other processors, each of which is a mirror image.

DETAILED DESCRIPTION OF THE DRAWINGS

Figure 1:
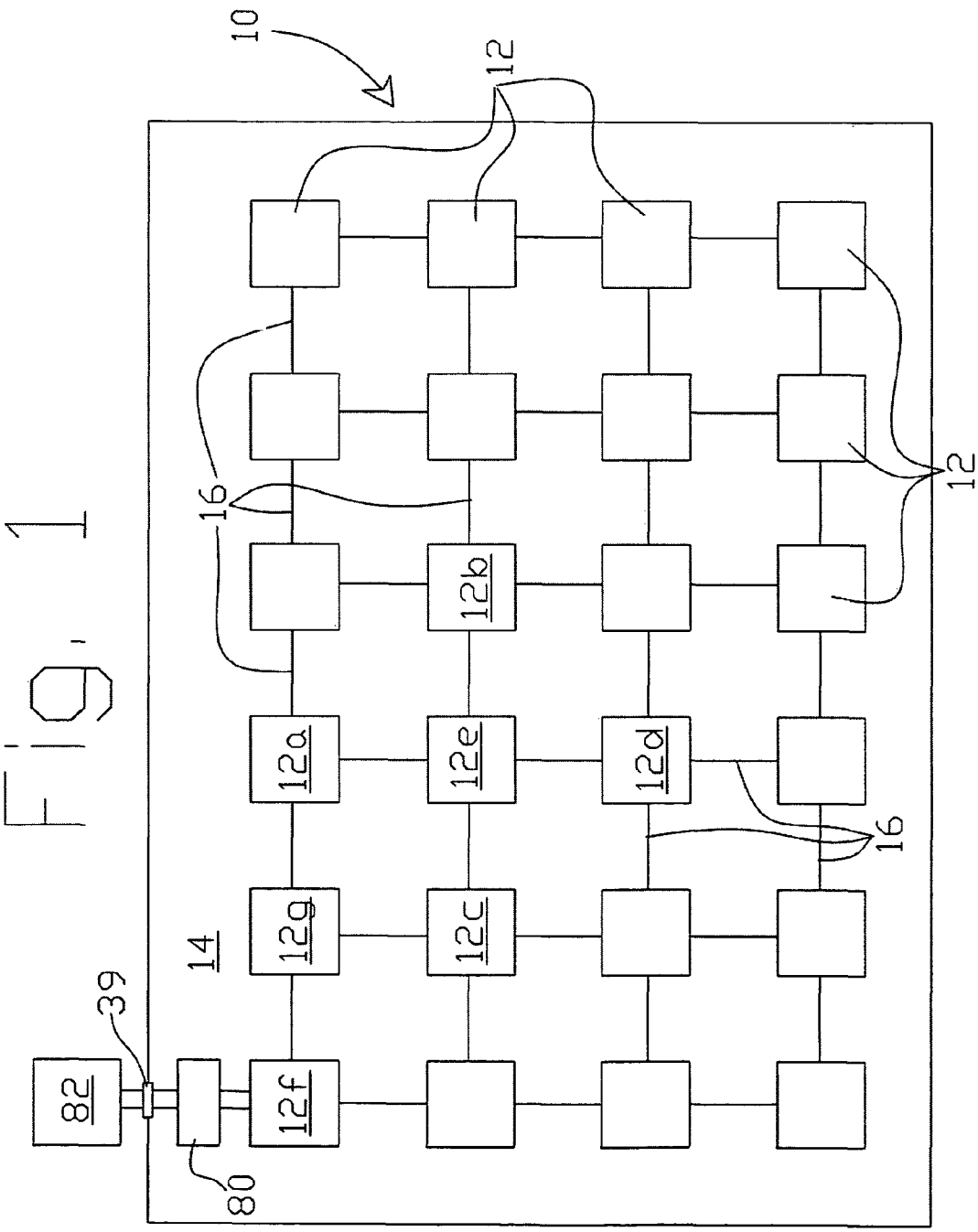
FIG. 1 is a diagrammatic view of a computer processor array, according to the present invention.

FIG. 1 shows an array 10 of interconnected computers 12 located on a single die 14; a total of twenty four (24) computers 12 were given as an example, wherein each edge such as 12g and corner computer such as 12f has several pins (not shown) located about their exterior periphery. Corner processor 12f is connected via an interface 80 and a port 39 to an external device 82. Each computer 12 has four ports connected to busses 16 that are designated as right, down, left, and up (RDLU). In FIG. 1, computer 12e has four adjacent computers 12, wherein computer 12b is the right neighbor, computer 12*d* is the down neighbor, computer 12*c* is the left neighbor, and computer 12*a* is the up neighbor, all with respect to the center computer 12*e*. Even though the edge computers such as 12*g* have only three adjacent neighbors and the corner computers such as 12*f* have only two adjacent neighbors, these edge and corner computers 12 still have four ports 35 which are also designated as RDLU.

Figure 2:
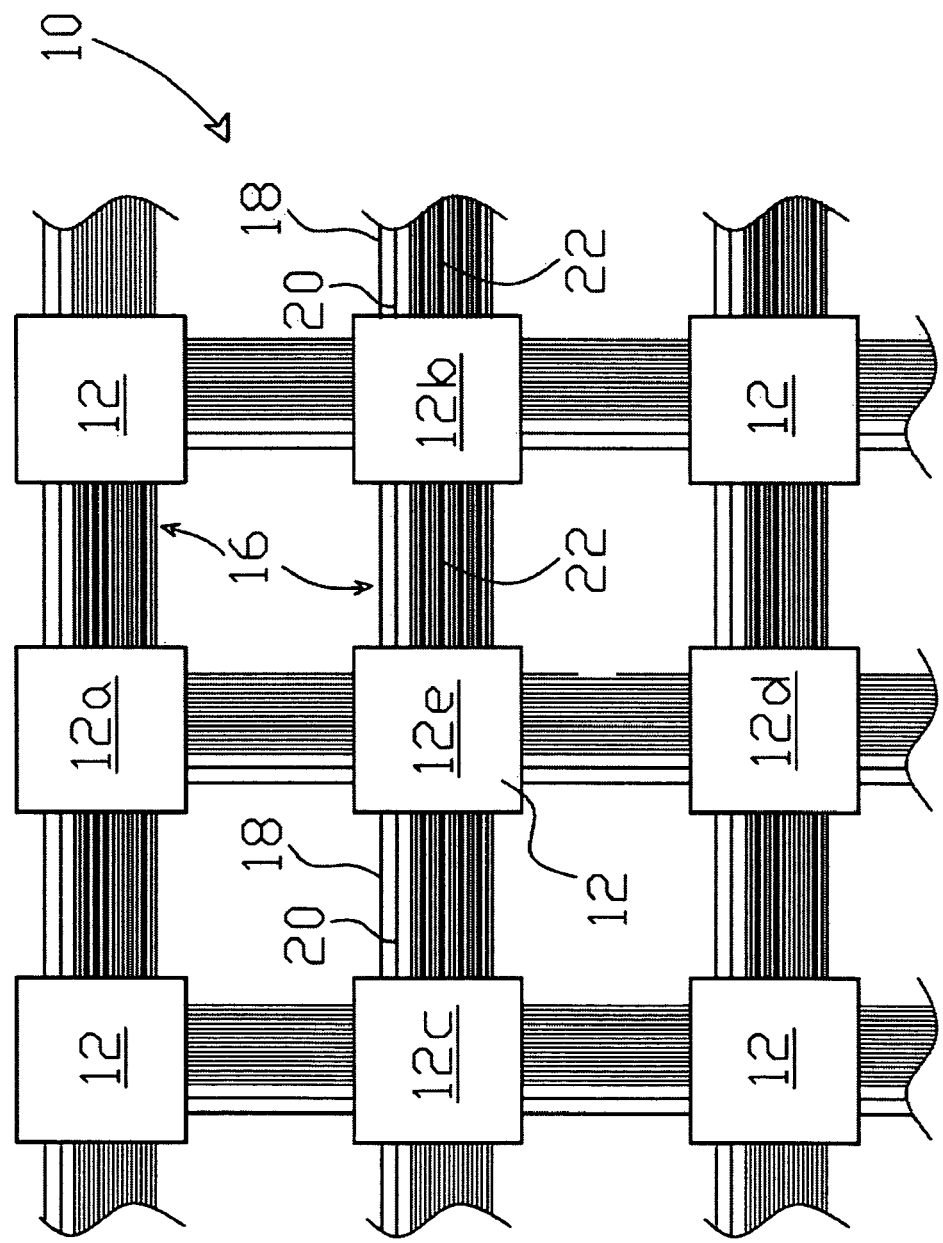
FIG. 2 is a detailed diagram showing a subset of the computer processors of FIG. 1 and a more detailed view of the interconnecting data buses of FIG. 1.

FIG. 2 is a more detailed view of a portion of FIG. 1 showing only some of the processors 12 and, in particular, processors 12*a* through 12*e*, inclusive. The view of FIG. 2 also reveals that the data buses 16 each have a read line 18, a write line 20 and a plurality (eighteen, in this example) of data lines 22. The data lines 22 are capable of transferring all the bits of one eighteen-bit instruction word simultaneously in parallel. It should be noted that, in one embodiment of the invention, some of the processors 12 are mirror images of adjacent processors.

Figure 3:
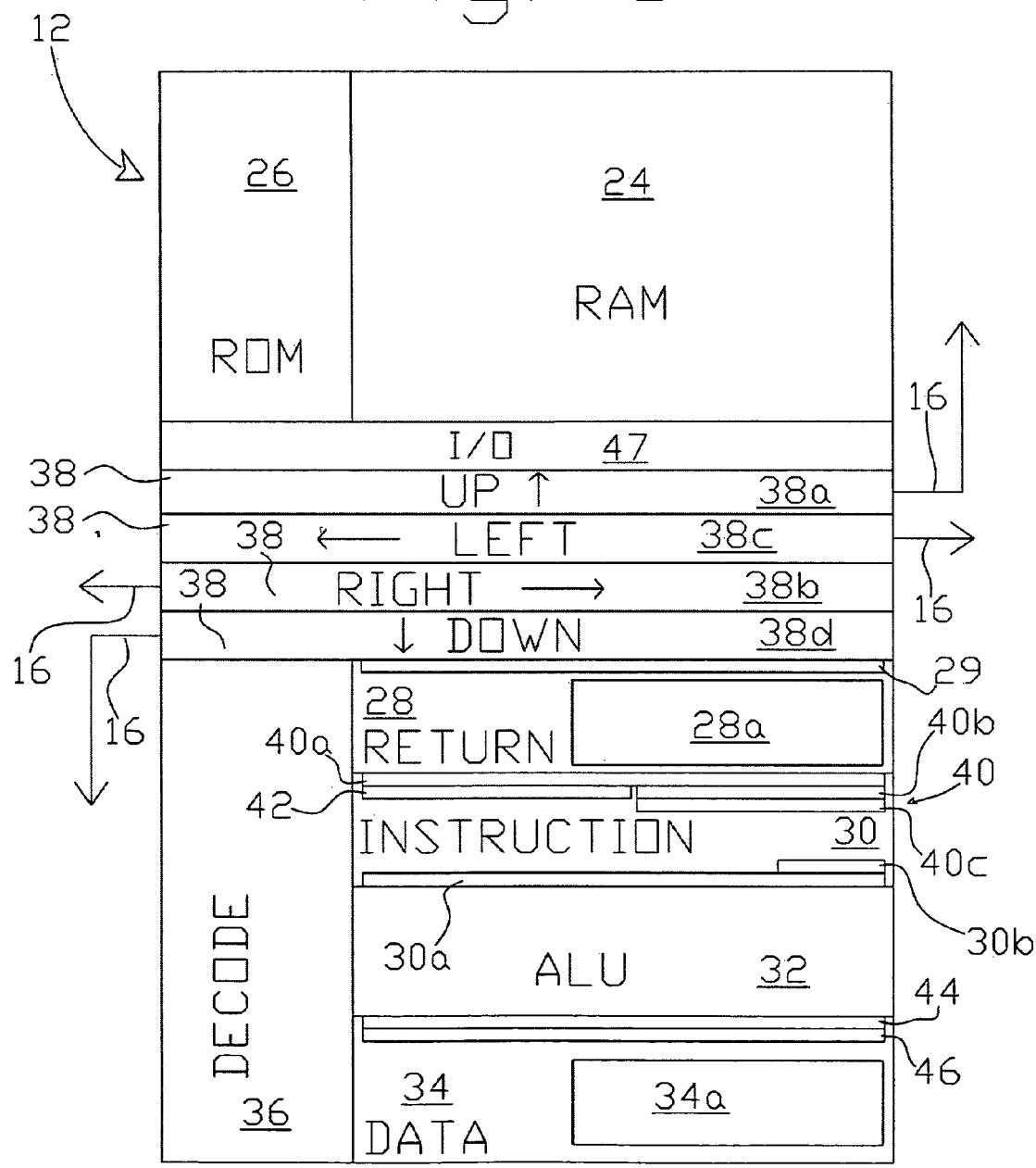
FIG. 3 is a block diagram depicting a general layout of one of the processors of FIGS. 1 and 2.

FIG. 3 is a block diagram depicting the general layout of an example of one of the processors 12 of FIGS. 1 and 2. As can be seen in the view of FIG. 3, each of the processors 12 is a generally self contained computer having its own RAM 24 and ROM 26. As mentioned previously, the processors 12 are also sometimes referred to as individual "nodes", given that they are, in the present example, combined on a single chip. Other basic components of the processor 12 are a return stack 28 (including an R register 29, discussed hereinafter), an instruction area 30, an arithmetic logic unit ("ALU" or "processor") 32, a data stack 34, a decode logic section 36 for decoding instructions, and a slot sequencer 42. One skilled in the art will be generally familiar with the operation of stack based computers such as the processors 12 of this present example. The processors 12 are dual stack processors having the data stack 34 and the separate return stack 28. FIG. 3 also shows circular register arrays 28*a* and 34*a* for the return stack and data stack, respectively, along with the T register 44 and S register 46 of the data stack 34.

Figure 4:
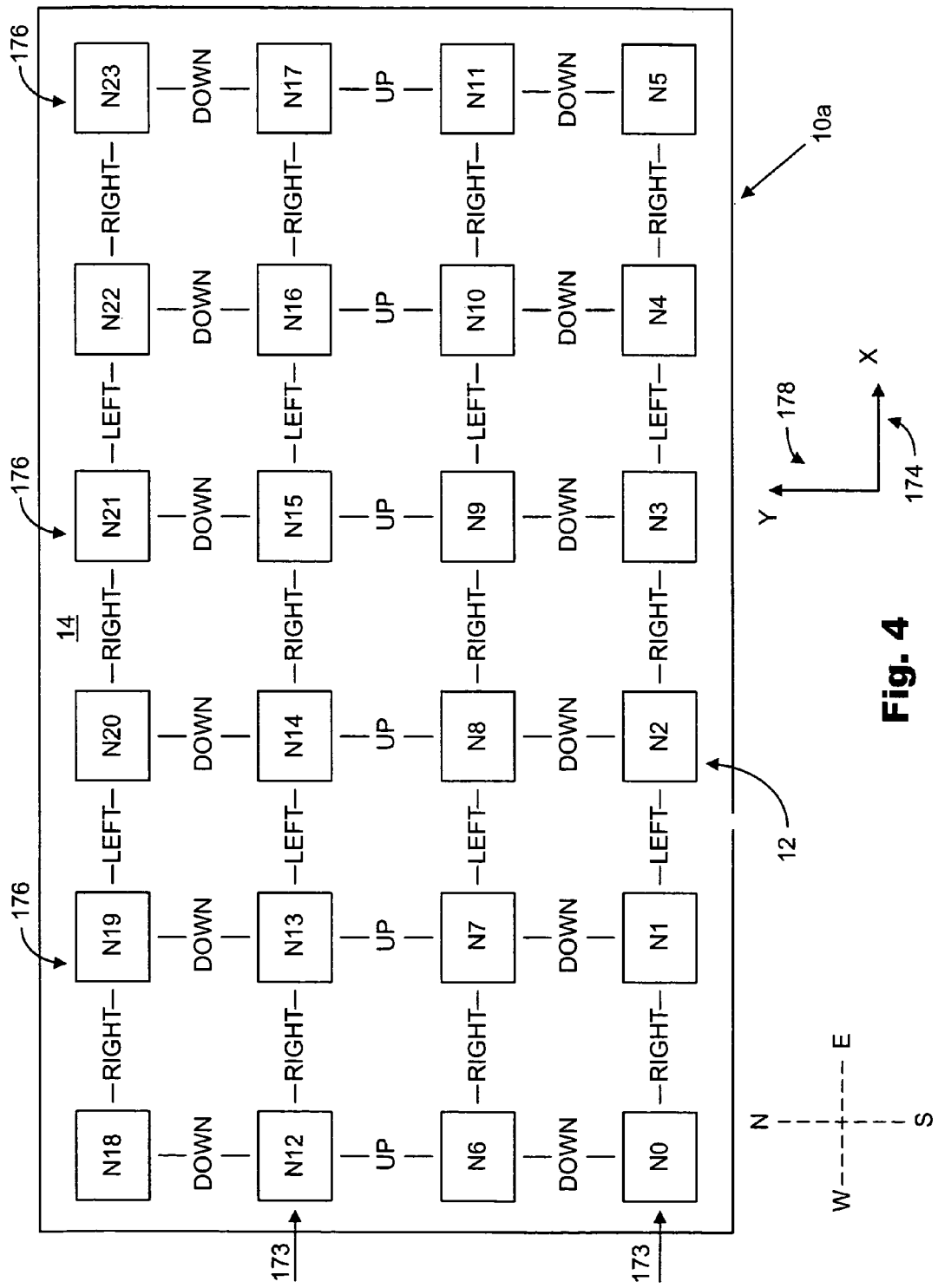
FIG. 4 is a block diagrammatic depiction of an alternative embodiment of the computer array.

FIG. 4 is a block diagrammatic depiction of an alternative computer array 10*a*. In this example of the invention, the array 10*a* has twenty four (24) computers 12. Also, in this embodiment of the invention, the computers 12 are arranged in a particular symmetric orientation, referred to as mirroring. That is, the computers 12 in the second and fourth alternating rows 173 from the top of the array 10*a* have been rotated about their x-axes 174, so that the down ports are now facing upward. All of the computers 12 in the second, fourth, and sixth alternating columns 176 with respect to the left side of the array 10*a* have been rotated about their y-axes 178, such that the right ports are now facing towards the left side of the array 10*a*. This results in computers N6, N8, N10, N18, N20 and N22 maintaining their original RDLU orientations. Computers N0, N2, N4, N12, N14, and N16 have been rotated about their x-axes 174 only, which is specifically referred to as "flipping." Computers N7, N9, N11, N19, N21, and N23 have been rotated about their y-axes 178 only, which is specifically referred to as "mirroring." Computers N1, N3, N5, N13, N15, and N17 have been rotated about both their x-axes 174 and their y-axes 178, which is specifically referred to as "reflecting." For future reference hereinafter, all forms of rotation will simply be referred to as mirroring, unless specifically stated otherwise.

With the exception of the computers 12 located at the corners and edges of the array 10*a*, these rotations result in all of the right ports directly facing each other; all of the down ports directly facing each other; all of the left ports directly facing each other; and all of the up ports directly facing each other. This allows the computers 12 to directly align and connect with their nearest neighbor computers 12 since the interconnects of a particular computer 12 are symmetric and directly adjacent with the interconnects of an adjacent connecting neighbor computer 12.

In order to have a way to refer to directions within the array 10*a* that does not change according to which way the computers 12 therein are rotated, the inventors have chosen to use the terminology North, South, East and West (NSEW). The directions of North, South, East, and West maintain their relative directions, even with computer rotations. This is relevant during routing, which is defined here as sending a message from one computer 12 to another non-adjacent computer 12 through intermediary computers 12. Directions (NSEW) are in a table located in ROM 26 in FIG. 3.

Figure 5:
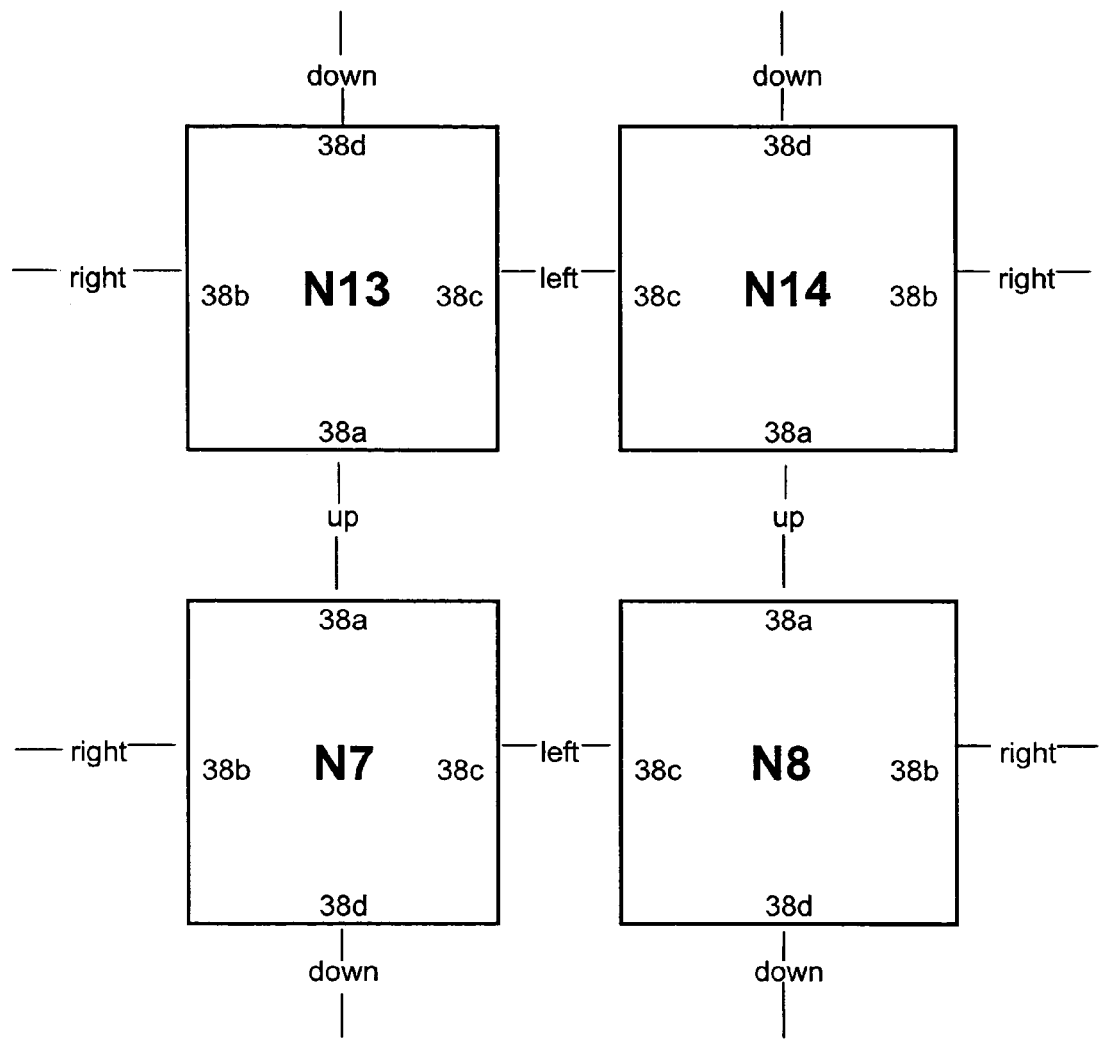
FIG. 5 is an expanded view of four nodes in the FIG. 4 embodiment.

FIG. 5 is an expanded view of four nodes, namely N7, N8, N13, and N14 from FIG. 4, which displays the right port 35*a*, the down port 35*b*, the left port 35*c*, and the up port 35*d* notations. In the given example, left ports 35*c* and up ports 35*d* do not connect to anything internal to the array 10*a* when they are on the outside border of the array 10*a*, although they will probably connect to an external I/O port 36 (FIG. 1). Down ports 35*b* and right ports 35*a* always connect to another computer 12 in this example, so long as the number of rows and columns of an array is an even number. As an example, computer N7 has four orthogonally adjacent neighbors, namely N6 which is connected to right port 35*a*, N1 which is connected to down port 35*b*, N8 which is connected to left port 35*c*, and N13 which is connected to the up port 35*d*.

Figure 6:
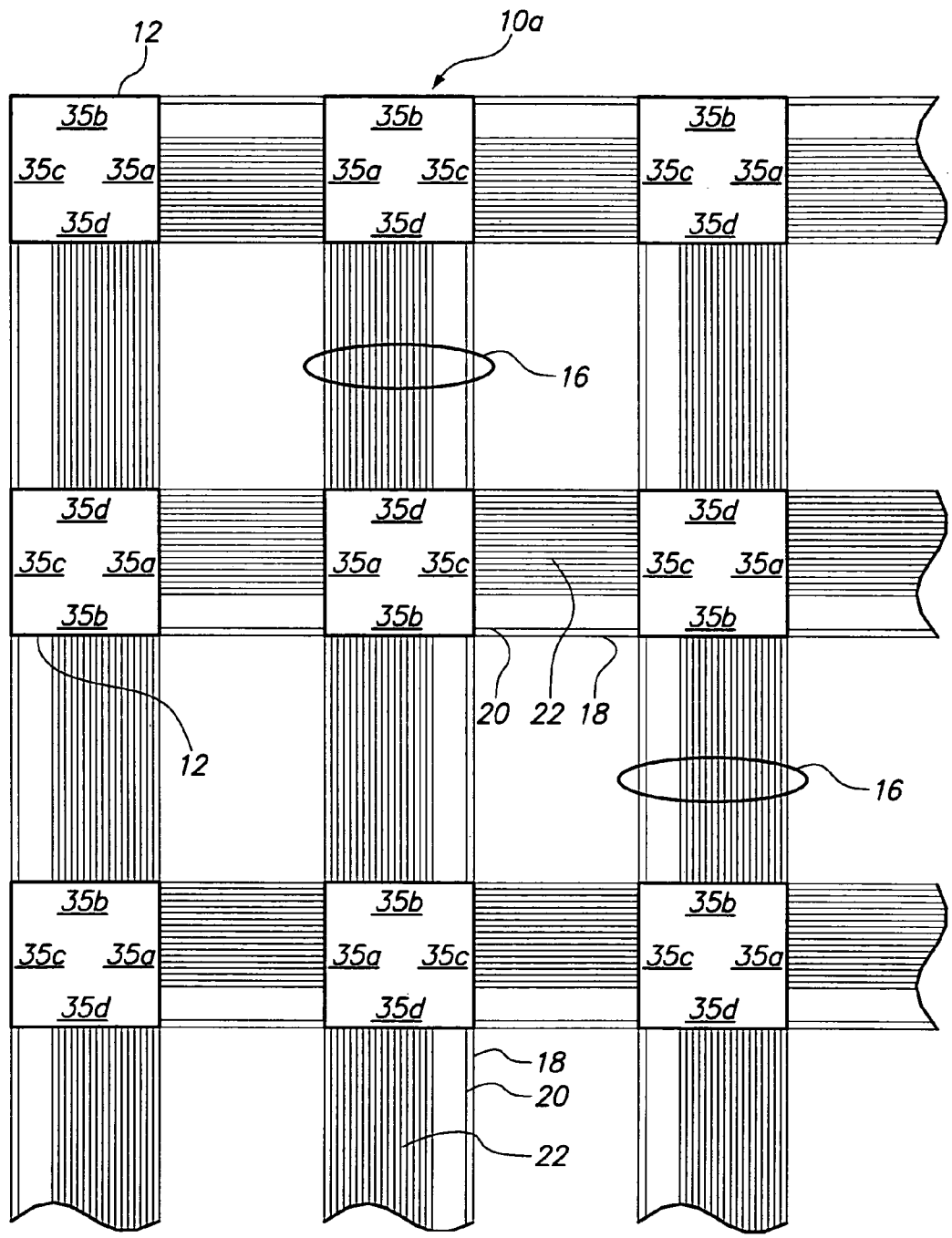
FIG. 6 is a more detailed view of a portion of the FIG. 4 embodiment.

FIG. 6 is a more detailed view of a portion of FIG. 4, showing only some of the computers 12. The concept and symmetry of mirroring is evidenced, wherein alternate rows of computers are rotated about the x-axis 174, and alternate columns of computers are rotated about the y-axis 178. FIG. 6 also shows that like ports are directly adjacent to each other, i.e., the right port 35*a* of a computer 12 is directly adjacent to the right port 35*a* of an adjacent computer 12, the left port 35*c* of a computer 12 is directly adjacent to the left port 35*c* of an adjacent computer 12, and so on. This mirrored arrangement provides a short and direct interconnection scheme for each shared data bus 16.

Figure 7:
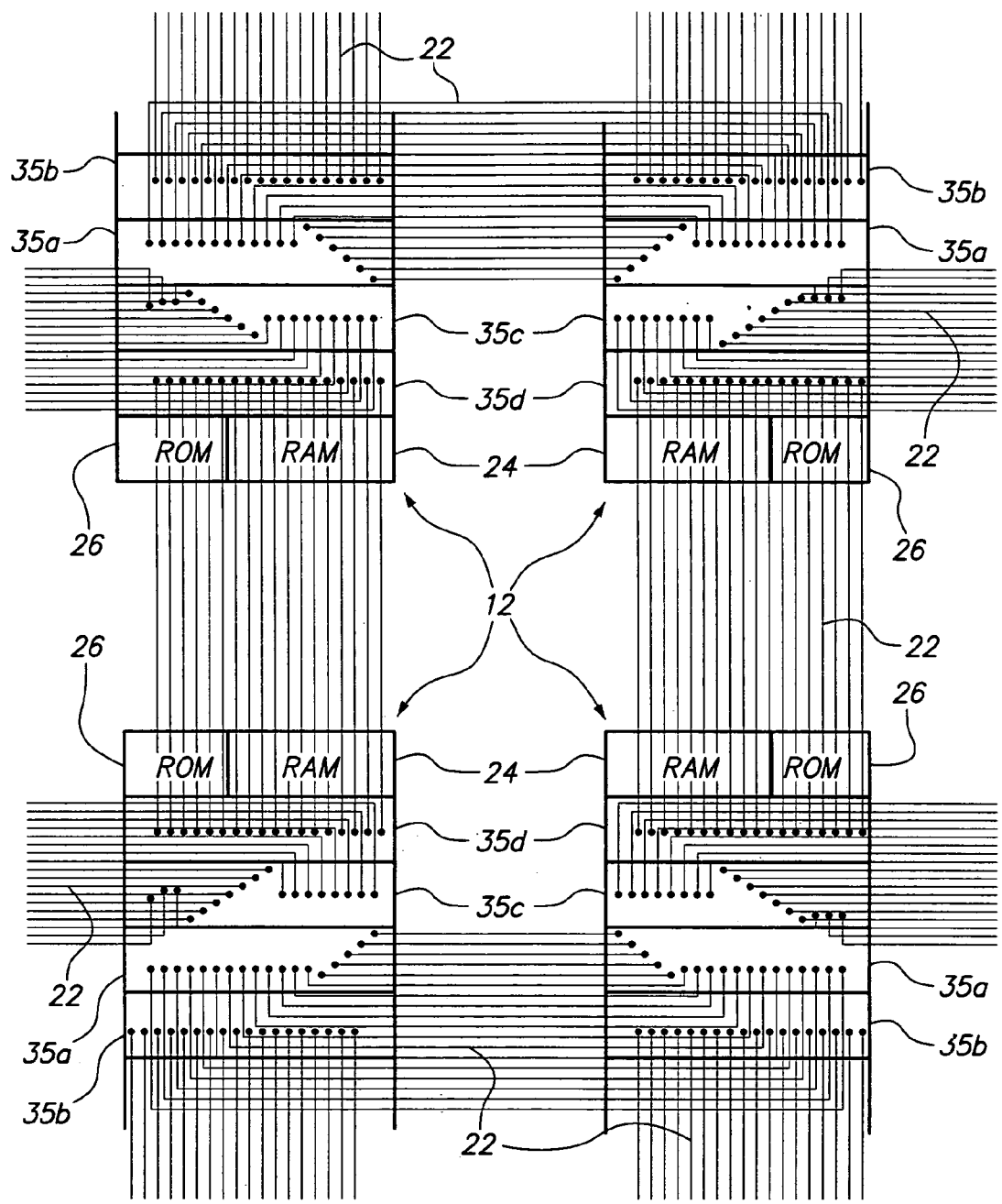
FIG. 7 is a diagram of four sets of data lines from the four ports interconnect within a computer according to the invention.

FIG. 7 shows how four sets of data lines 22 from the four ports 35 (right port 35*a*, down port 35*b*, left port 35*c*, and up port 35*d*) interconnect within a computer 12. FIG. 7 also shows how the four sets of data lines 22 extend beyond the four sides of a computer 12 to interconnect with a neighboring computer 12. This provides an interconnection network such that the zero bit line, or zero data line 22 of a computer 12 is connected to the zero bit line, or zero data line 22 of an adjacent computer 12 in the shortest possible way. The one bit line, or the one data line 22 of a computer 12 is connected to the one bit line, or the one data line 22 of an adjacent computer 12 in the shortest possible way, and so on. There is no crossing of a data line 22 over another data line 22 between computers 12 in order to connect a data line 22 of one computer 12 to the proper or intended connection site of another computer 12. Mirroring provides the shortest possible length of interconnecting data lines 22, and mirroring avoids interference or undesirable contact of data lines 22 to other data lines 22 or to the surface of a computer 12. Mirroring between computers 12 also minimizes capacitance and prevents latch-up.

Figure 8:
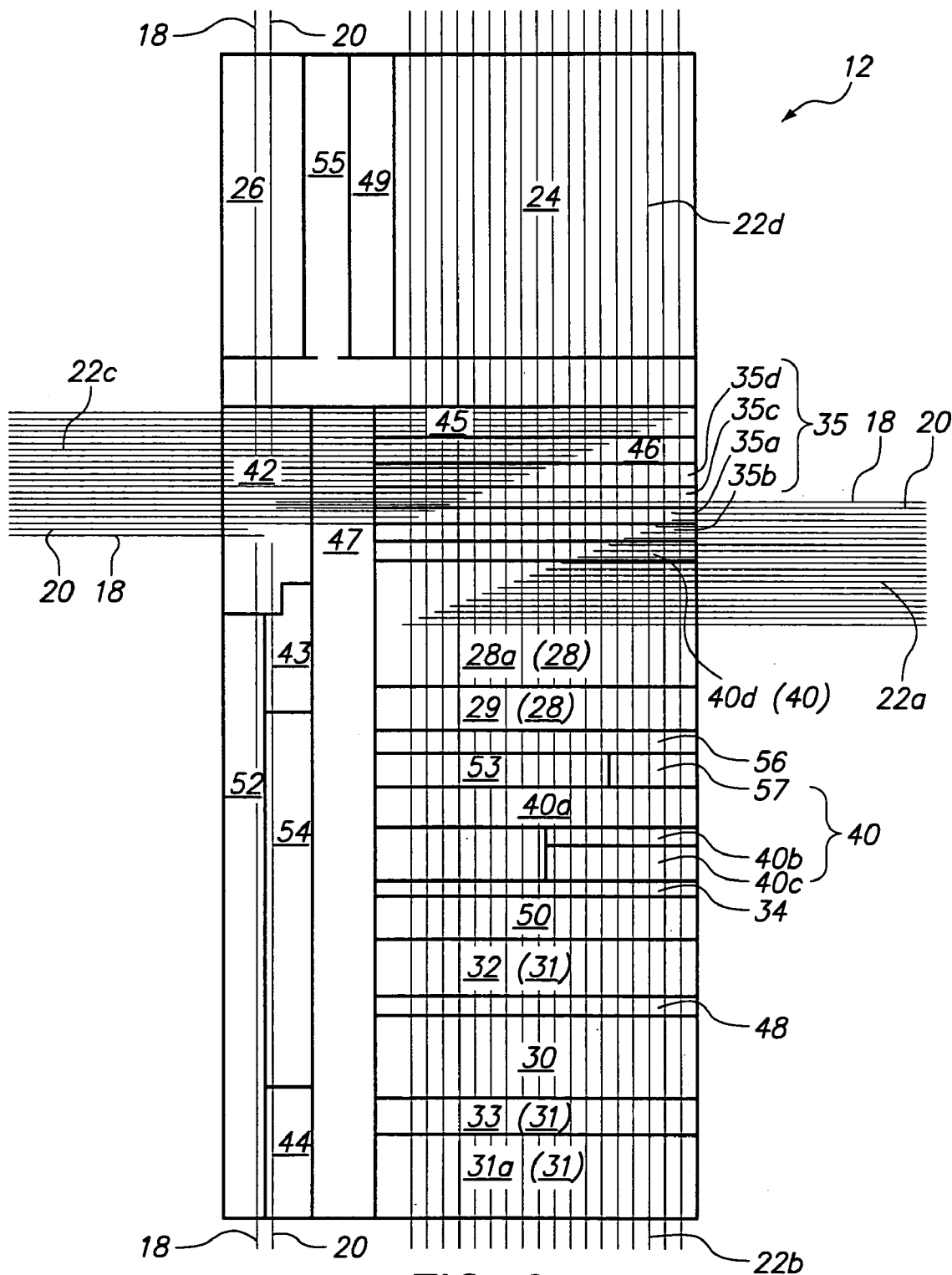
FIG. 8 is a diagram of four sets of data lines converging into one computer.

FIG. 8 displays the four sets of data lines 22 converging into one computer 12. FIG. 8 also displays the four sets of read lines 18 and the four sets of write lines 20 which connect to the register selector and handshake area 42. A great deal of architecture efficiency can be achieved by utilizing mirroring. Several data lines 22 can be connected to their respective communications ports 35 within a small area without interfering with one another.

Figure 9:
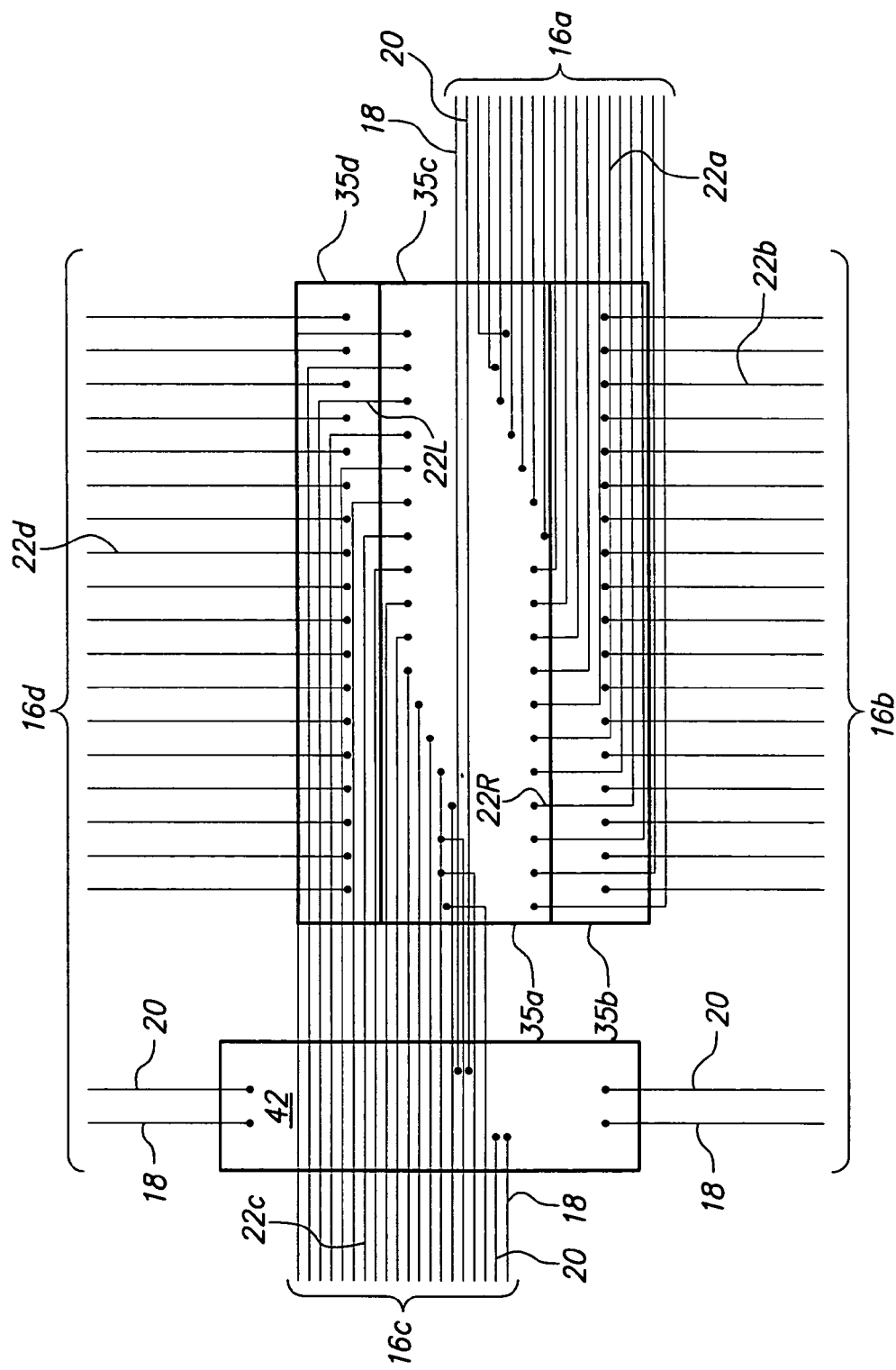
FIG. 9 is a closer view of a portion of the FIG. 8 embodiment.

FIG. 9 is a closer view of the communications ports 35 and register selector and handshake area 42 of FIG. 8. For this particular computer 12 orientation, the right data bus 16a would be directly connected to an adjacent right computer 12 (not shown); the down data bus 16b would be directly connected to an adjacent down computer 12 (not shown); the left data bus 16c would be directly connected to an adjacent left computer 12 (not shown); and the up data bus 16d would be directly connected to an adjacent up computer 12 (not shown). The right data lines 22a connect to the right communications port 35a in the computer 12 shown; the down data lines 22b connect to the down communications port 35b; the left data lines 22c connect to the left communications port 35c; and the up data lines 22d connect to the up communications port 35d. FIG. 9 displays how some of the right data lines 22a contain a right angle portion 22R, located above and below its communications port 35a. In addition, some of the left data lines 22c also contain a right angle portion 22L, located above and below its communications port 35c. This allows all of the data lines 22 to connect to a smaller area communications port 35 than would be the case if the mirror image were not present. The incoming terminal ends of the right data lines 22a complement the incoming terminal ends of the left data lines 22c without interfering with one another. The four sets of read lines 18 and write lines 20 also connect to the register selector and handshake area 42 without interfering with one another.

Figure 10:
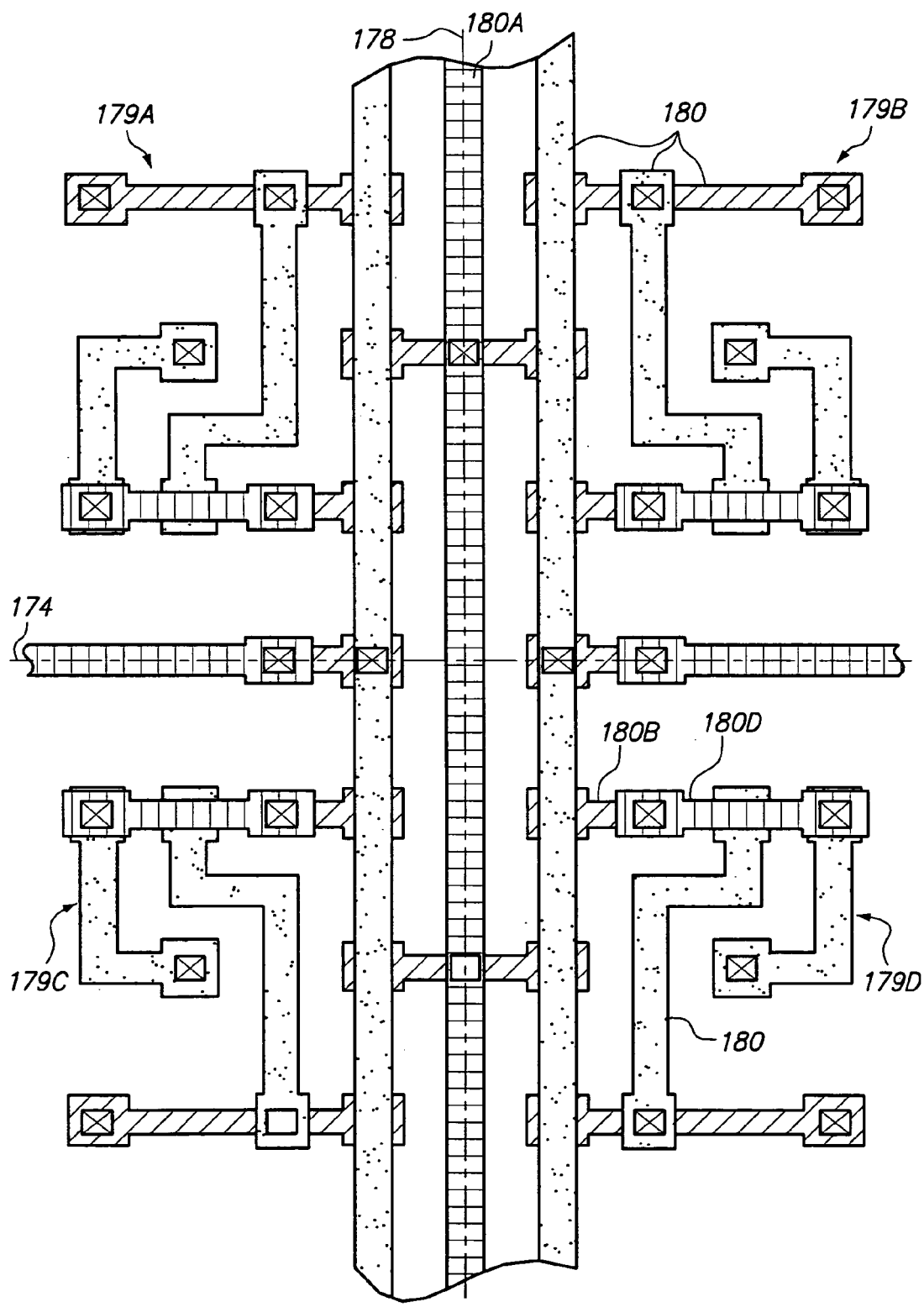
FIG. 10 displays four adjacent RAM memory cells according to the invention.

Mirroring is also utilized within a computer 12, including within a RAM 24 memory cell, within a ROM 26 memory cell, within the address decode 55, and within registers 40, as described hereinafter. FIG. 10 displays four adjacent RAM memory cells 179 containing a plurality of metal lines 180. A power bus 180a is positioned vertically between each column of RAM memory cells 179. Three different layers of metal lines 180 are shown in addition to the power bus 180a, namely metal line one 180b, metal line two 180c, and metal line three 180d. Mirroring can be observed about the y-axis 178 between the two night RAM memory cells 179 and the two left RAM memory cells 179. Mirroring can also be observed about the x-axis 174 between the two top RAM memory cells 179 and the two bottom RAM memory cells 179. Mirroring between RAM memory cells 179 provides a more compact RAM 24 architecture of a computer 12.

Figure 11:
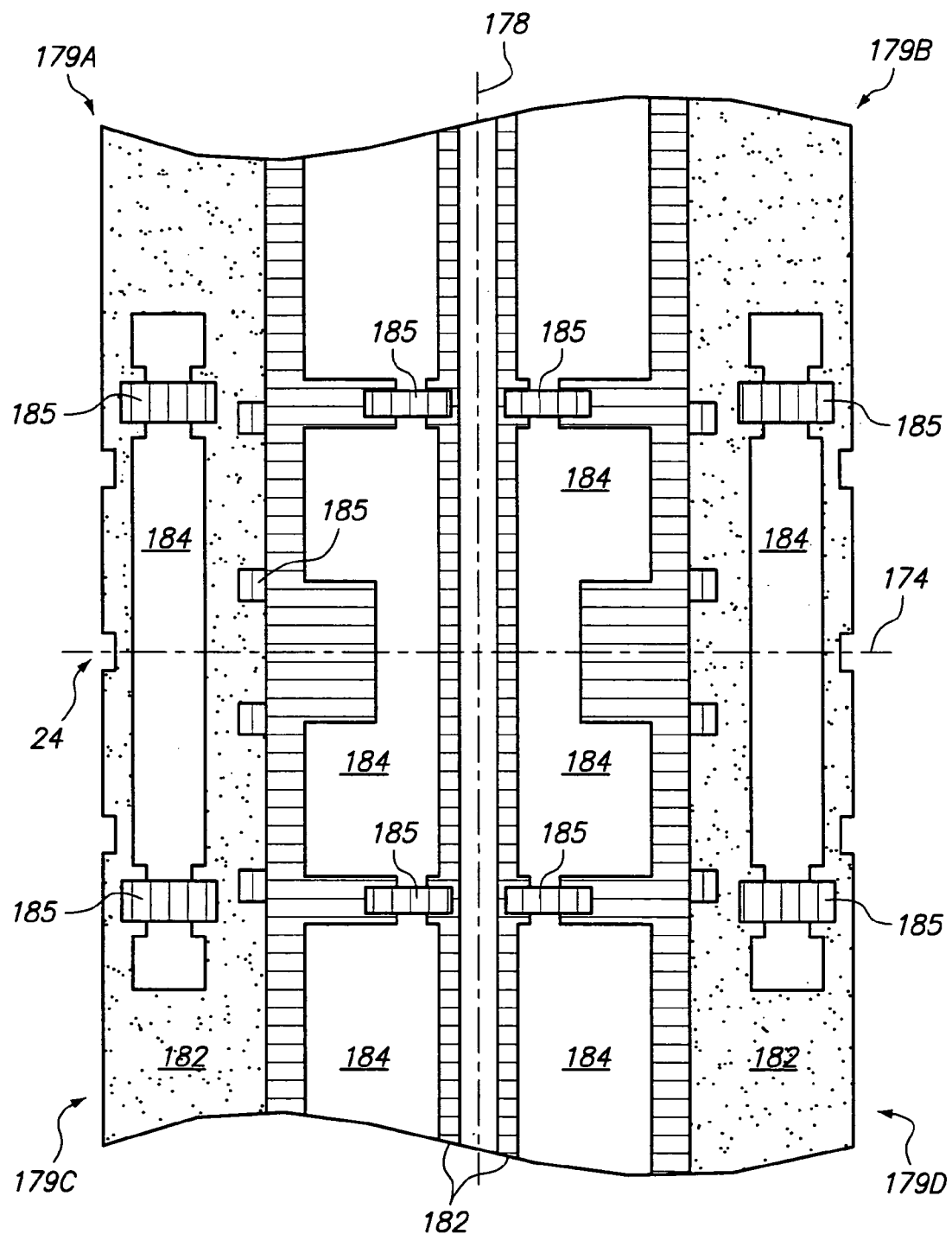
FIG. 11 displays the four adjacent RAM memory cells in an alternative embodiment.

FIG. 11 displays the same four adjacent RAM memory cells 179 as shown in FIG. 10, with a power bus 180a positioned vertically between RAM memory cells 179. In addition to the metal lines 180 described with reference to FIG. 10, RAM memory cells 179 also contain an n well 181, a p well 182, ground regions 183, diffusion contact areas 184, and polysilicon regions 185, which are displayed in FIG. 11. Mirroring can again be observed about the y-axis 178 between the two right RAM memory cells 179 and the two left RAM memory cells 179. Mirroring can also be observed about the x-axis 174 between the two top RAM memory cells 179 and the two bottom RAM memory cells 179. Mirroring between these features provides a more compact architecture within the RAM 24 of a computer 12.

Figure 12:
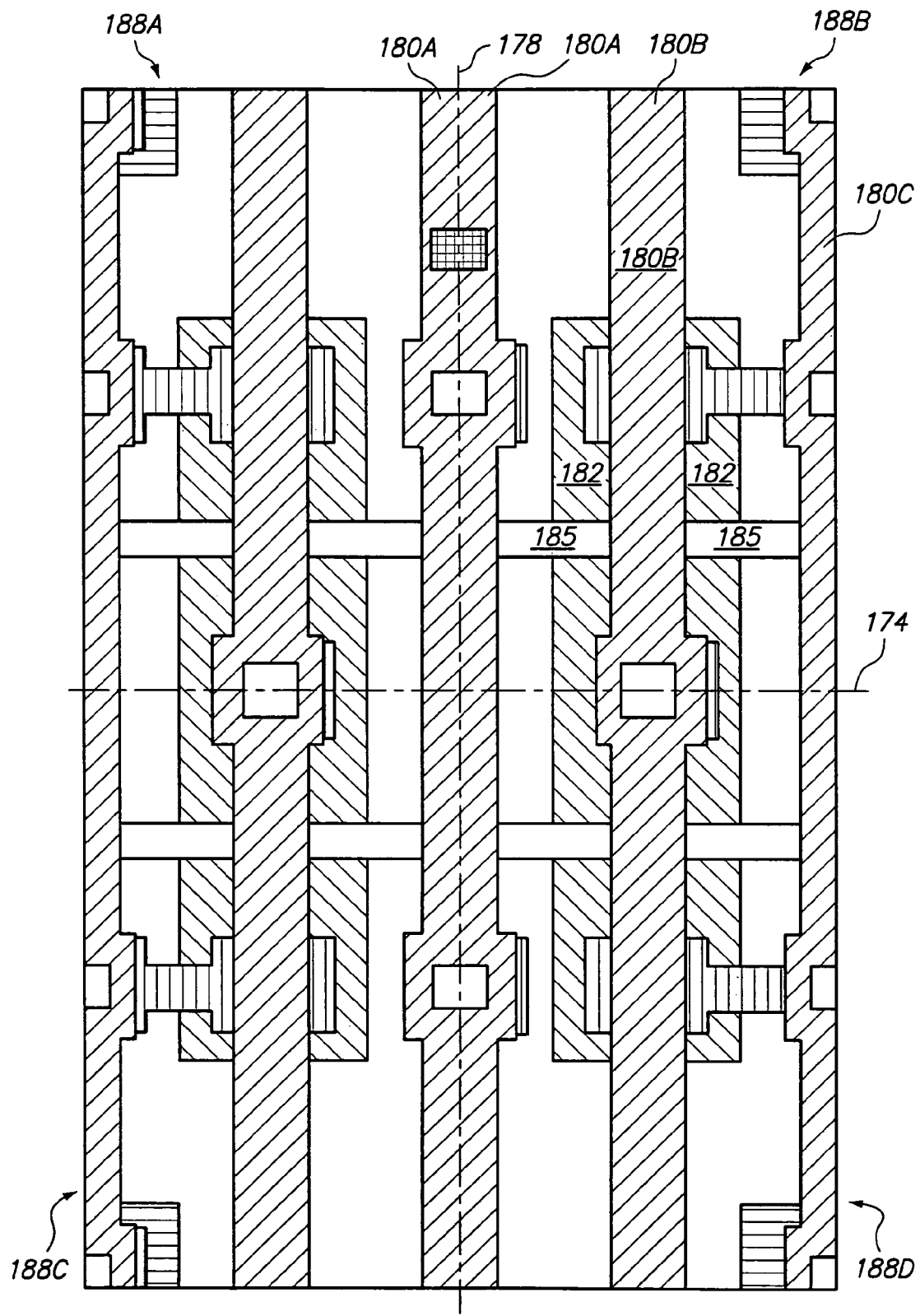
FIG. 12 displays four adjacent ROM memory cells according to the invention.

FIG. 12 displays four adjacent ROM memory cells 188. There is a power bus 180a that is positioned vertically between each column of ROM memory cells 188. Each ROM memory cell 188 contains a p well 182, a polysilicon region 185, a metal line one 180b, and a metal line two 180c. It can be seen from FIG. 12 that the two right ROM memory cells 188 are a mirrored image about the y-axis 178 of the two left ROM memory cells 188. Likewise, the two top ROM memory cells 188 are a mirrored image about the x-axis 174 of the two bottom ROM memory cells 188. This mirrored positioning provides a more compact architecture within the ROM 26 of a computer 12. The omission of an n-well saves additional space.

Figure 13:
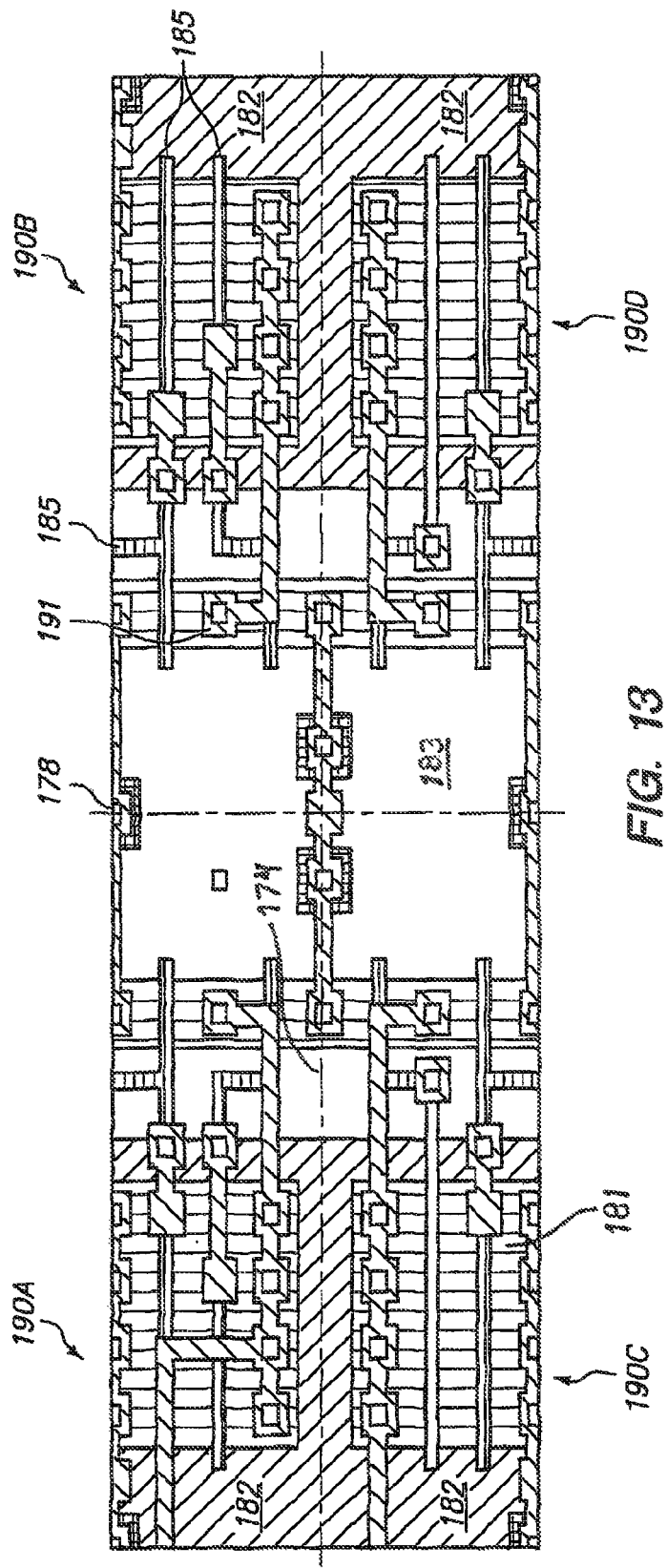
FIG. 13 displays four adjacent address decode NAND gates according to the invention.

FIG. 13 displays four adjacent address decode NAND gates 190. Each address decode NAND gate 190 contains an n well 181, a p well 182, a polysilicon region 185, and a ground region 183. A metal line four 191 is also displayed. Mirroring about the x-axis 174 and the y-axis 178 between NAND gates 190 is utilized to produce a more compact architecture within the address decode 55 region of a computer 12.

Figure 14A:
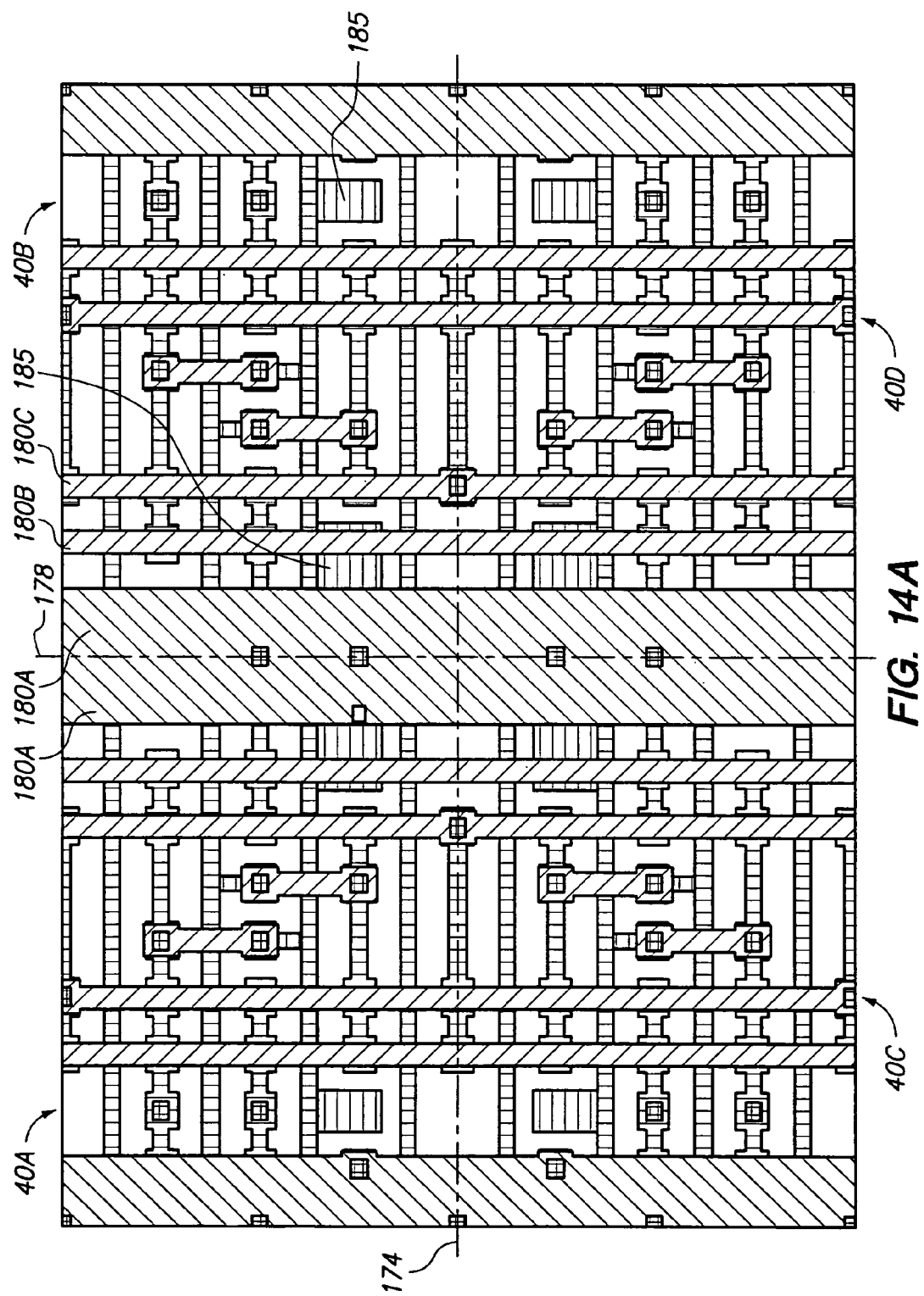
FIG. 14a is a diagram of a partial region of four registers according to the invention.
Figure 14B:
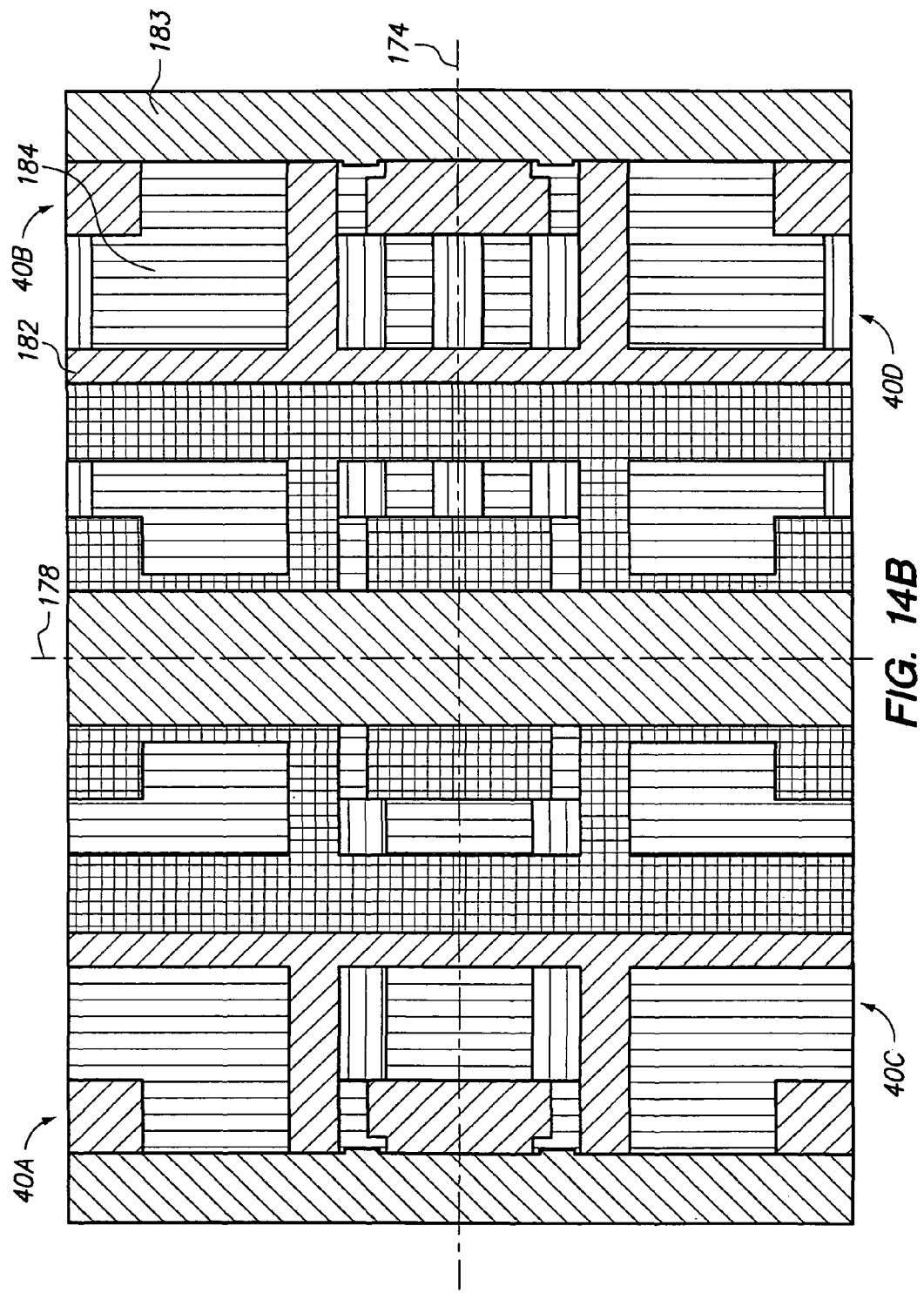
FIG. 14b is a diagram of a partial region of four registers according to the invention.

Mirroring can also be utilized within the registers 40 of a computer 12. FIG. 14a displays a partial region of four registers 40, namely a power bus 180a, metal lines one 180b, metal lines two 180c, and polysilicon regions 185. FIG. 14b shows the same partial region of four registers 40 as FIG. 14a. This partial region of four registers 40 shown in FIG. 14b also contains an n well 181, a p well 182, a ground region 183, and a diffusion contact area 184. Mirroring about the x-axis 174 and the y-axis 178 between regions of a plurality of registers 40 is utilized to produce a more compact architecture within registers 40 of a computer 12.

The presently described invention utilizes mirroring within the RAM 24 and ROM 26 memory regions, the address decode region 55, and the registers 40 within a computer 12. The presently described invention also utilizes mirroring between computers 12 on a die 14. This combined mirroring produces a very compact and efficient die 14.

Even though specific examples of mirroring as described above have been given, mirroring can be utilized in a multitude of other capacities to produce a more compact and efficient die 14. Therefore, the invention as described herein is only limited by the claims appended hereto.

INDUSTRIAL APPLICABILITY

The inventive computer logic array 10, instruction set and method are intended to be widely used in a great variety of computer applications. It is expected that they will be particularly useful in applications where significant computing power and speed is required.

As discussed previously herein, the applicability of the present invention is such that the inputting information and instructions are greatly enhanced, both in speed and versatility. Also, communications between a computer array and other devices are enhanced according to the described method and means. Since the inventive computer logic array 10, and method of the present invention may be readily produced and integrated with existing tasks, input/output devices and the like, and since the advantages as described herein are provided, it is expected that they will be readily accepted in the industry. For these and other reasons, it is expected that the utility and industrial applicability of the invention will be both significant in scope and long-lasting in duration.

The invention claimed is:

1. A microprocessor address decode region configuration, comprising:

a. a plurality of NAND gates arranged in a matrix in said address decode region, wherein each of said plurality of NAND gates comprises an n well and a p well;

b. wherein an orientation of a p well contained within one of said plurality of NAND gates is a mirrored image of an orientation of a p well contained within a directly adjacent NAND gate, and an orientation of an n well contained within said one of said plurality of NAND gates is a mirrored image of an orientation of an n well contained within said directly adjacent NAND gate;

c. and further wherein an orientation of a plurality of metal connecting lines in an upper portion of said NAND gate matrix is a mirrored image of an orientation of said plurality of metal connecting lines in a lower portion of said NAND gate matrix, and an orientation of said plurality of metal connecting lines in a left-hand portion of said NAND gate matrix is a mirrored image of an orientation of said plurality of metal connecting lines in a right-hand portion of said NAND gate matrix.

2. The address decode region configuration of claim 1, wherein an orientation of a plurality of p wells in a left-hand portion of said NAND gate matrix is a mirrored image of an orientation of a plurality of p wells in a right-hand portion of said NAND gate matrix, and an orientation of a plurality of n wells in said left-hand portion of said NAND gate matrix is a mirrored image of an orientation of a plurality of n wells in said right-hand portion of said NAND gate matrix.

3. The address decode configuration of claim 1, wherein said mirrored image comprises a reversed image about an intervening axis or plane.

4. The address decode configuration of claim 1, wherein said mirrored image comprises a direct and opposite placement about an intervening axis or plane.

* * * * *